Figure 1:
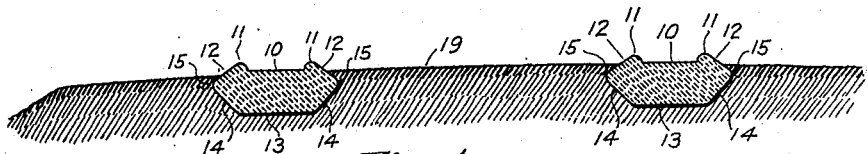

F. L. PITMAN.
ROADWAY FOR VEHICLES.
APPLICATION FILED MAY 1, 1912.

1,056,935.

Patented Mar. 25, 1913.
2 SHEETS—SHEET 1.

WITNESSES
E. A. Skelley
C. Koerner

INVENTOR
Frederick L. Pitman
BY
L. L. Westfall ATTORNEY

F. L. PITMAN.
ROADWAY FOR VEHICLES.
APPLICATION FILED MAY 1, 1912.

1,056,935.

Patented Mar. 25, 1913.

2 SHEETS—SHEET 2.

WITNESSES

INVENTOR
Frederick L. Pitman
BY
ATTORNEY

UNITED STATES PATENT OFFICE.

FREDERICK L. PITMAN, OF SPOKANE, WASHINGTON.

ROADWAY FOR VEHICLES.

1,056,935.  Specification of Letters Patent.  Patented Mar. 25, 1913.

Application filed May 1, 1912. Serial No. 694,520.

*To all whom it may concern:*

Be it known that I, FREDERICK L. PITMAN, citizen of the United States of America, residing at Spokane, in the county of Spokane and State of Washington, have invented certain new and useful Improvements in Roadways for Vehicles, of which the following is a specification.

This invention pertains to roadways and has for its object to provide road rails of such details of construction and so arranged and embedded upon a highway as to provide substantially a pavement for automobiles, wagons, trucks, buggies and other two or four wheeled vehicles to travel upon. Thus practically supplying a road pavement at the cost of laying parallel rails longitudinally of the roadway at a sufficient distance apart to carry the wheels within their tread. Features of this class of roadways that I claim to have covered in my construction shown by the drawings accompanying this specification include a road rail having sufficient width and design of tread to accommodate and receive the different gages of vehicles ordinarily used upon public highways, a road rail provided with flanges upon each side of the tread thereof for the purpose of retaining and directing the wheels of vehicles upon the track, similar to the flanges of car wheels and utilized for a like purpose, inclined surfaces approaching the flanges upon each side of the tread of the rail for the purpose of supporting and leading the wheels of vehicles to and from the adjacent roadway surface and the track, a road rail provided with flanges for the retention of the wheels of vehicles, so located, designed and combined with the tread and inclined surfaces of the rail and with the adjacent roadway as to admit of the wheels of a vehicle readily mounting or leaving the rails of the track as desired, a road rail of such design, magnitude and weight that when embedded in the roadway will remain firm and stationary under the action of the wheels of moving vehicles and will support heavy loads, a road rail so constructed as to be readily and securely tamped and packed in a permanent position to give economy of maintenance and support heavy loads and provide easy and rapid transit thereover, a road rail so constructed that it readily maintains itself in true alinement, a road rail that can be manufactured in shops and made of suitable weight, dimensions and shapes to conform to the usual requirements of the same as well as to provide for curves, angles, corners, culverts, bridges and the like, and provided with means for interlocking engagement of one rail with the other, with due regard for the requirements as to the expansion and contraction of the rails caused by changes in temperature. Provision is made for reinforcing the most exposed portions of the rail.

Reference is now had to the drawings, in which—

Figure 2:
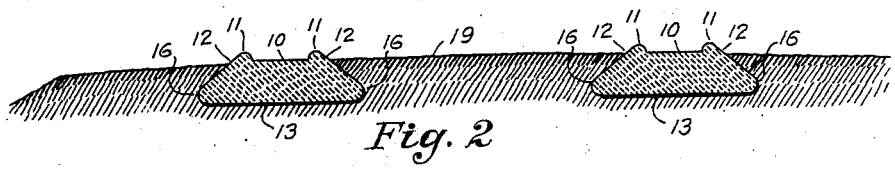
Figure 3:
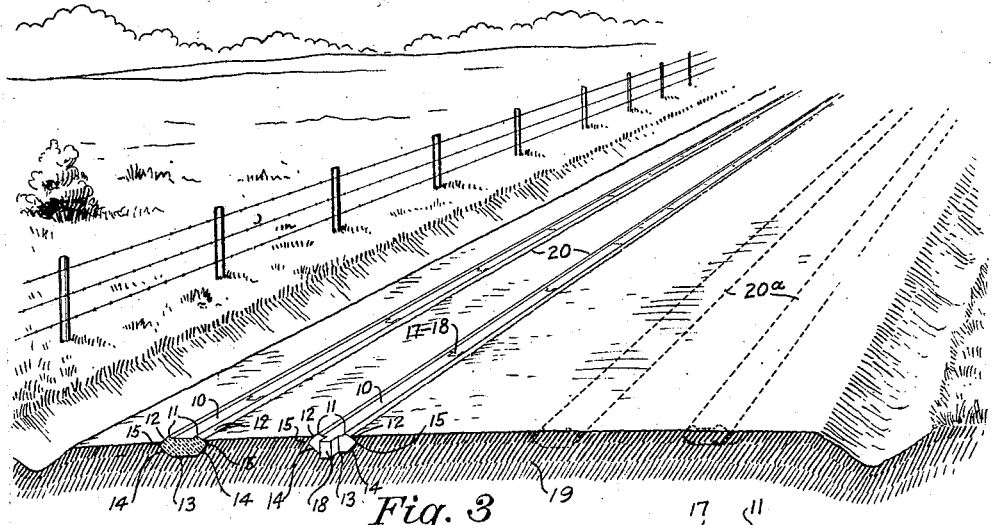
Figure 4:
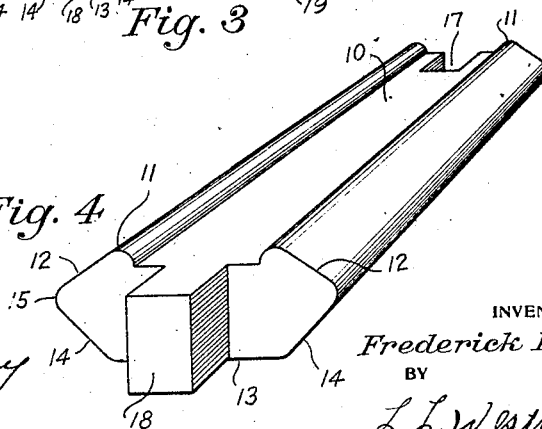
Figure 5:
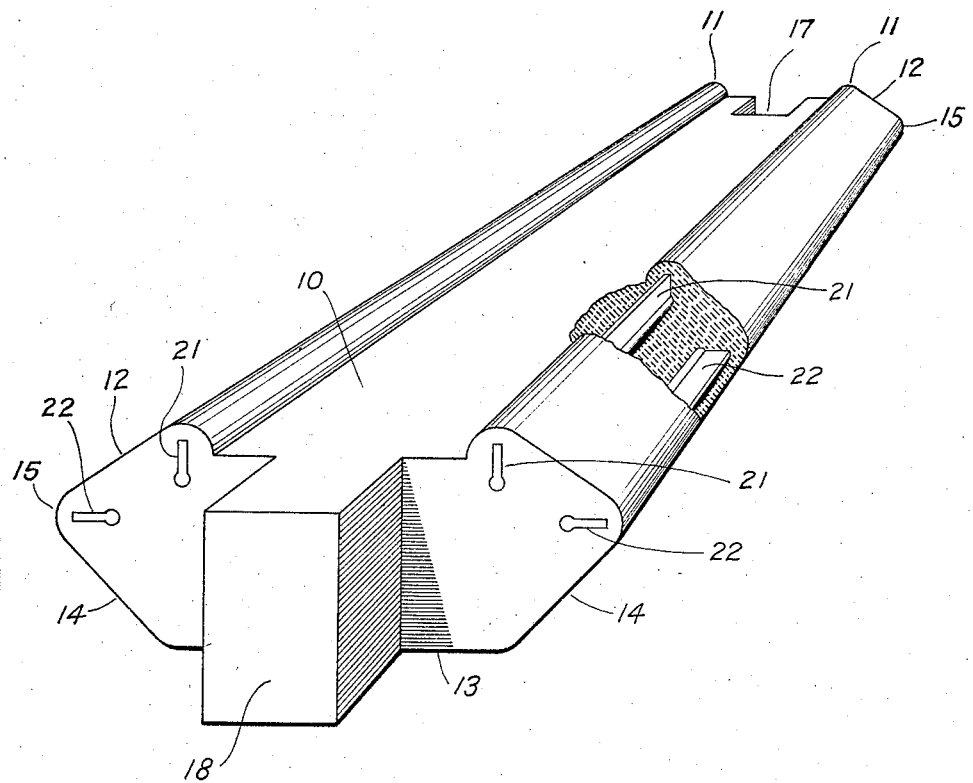

Figure 1, is a transverse sectional view of a pair of rails embedded in the usual manner in a roadway a section of which roadway is also shown: Fig. 2, is a like view with the rails varying as to some details of construction, Fig. 3, is a perspective view of a roadway provided with a pair of tracks constructed with my improved rail, illustrating also by dotted lines a pair of rails that may be provided for traffic in the opposite direction, Fig. 4, is an enlarged detail view of the rail without the reinforcement, Fig. 5, is an enlarged detail view of a rail showing an embedded reinforcement arranged longitudinally of the rail at the most exposed portions thereof.

In detail of construction the invention consists of heavy sections of rails each comprising a tread 10 horizontal in cross-section, a flange 11 on each side of the tread, beveled sides 12, reaching outwardly from the top of the flanges and downwardly to a point approximately one-half of the vertical thickness of the rails, a base 13 horizontal in cross-section at the center thereof, beveled at the sides of the base as at 14, the beveled surfaces extending upwardly and outwardly, meeting the outwardly and downwardly extending beveled surfaces 12 at a more or less blunt point of contact as at 15. The base 13 may be broadened and be provided with rounding edges as at 16. Each rail is provided with a vertical, central groove 17 at one end and a vertical, central tenon 18 at the other end, the groove in one rail and the tenon in another adapted for being brought into locking engagement with each other. The rails are embedded in the earth 19 to such a depth as to provide an easy access from the level of the roadway to the inclined surfaces 12. The tread 10 is made of sufficient width to readily take the tires of the heaviest truck or the largest tires used on an automobile. The flanges 11 are made very distinct to provide an abrupt inner surface to keep the tires of vehicles within the tread, it being the intention to keep the wheels upon the tread as against any usual carelessness or side swaying in driving, so that in order to leave the rails it will require a premeditated rather abrupt turn sidewise to carry the vehicle from the provided road-way. The beveled surfaces 14 of the rail, enabling the same to be packed and tamped with earth or gravel thereby giving a strong resistance as against a tendency to sway laterally, has a tendency to direct the disturbing force toward the center of the rail and downwardly and the broad base 13 acts as a sustaining force as against downward pressure thereby assuring the rail remaining in its proper embedded position. The interlocking means of the groove 17 and tenon 18 insures the rail sections being held in relative alinement. In addition to the general use of this construction of road rails the same may be used as a road rail and at the same time as stringers for culverts across depressions and streams.

The rails are preferably composed of cement or artificial stone.

The steel reinforcing strips 21 and 22 arranged longitudinally of the rail are substantially embedded in the body of the rail and reach out into the flanges 11 and the point 15 respectively. Should the cement be chipped away or crumbled at points along the rail, those strips will remain to check the progress of the same and also to maintain the integrity of these portions of the rails.

Having thus described my invention what I claim as new and useful and desire to secure by Letters-Patent, is,

1. In a roadway for vehicles, rails with a substantial body for embedment in the roadway having a tread along the upper surface, horizontal in cross-section, longitudinally arranged, a distinct flange on each side thereof reaching upwardly a substantial distance above the tread, beveled surfaces extending outwardly and downwardly from the tops of the flanges on each side of the tread and adapted for a support for the wheels of vehicles in mounting and leaving the rails.

2. In a roadway for vehicles, rails having a tread horizontal in cross-section, with a distinct flange on each side thereof extending upwardly a substantial distance above the tread, beveled surfaces extending from the tops of the flanges outwardly and downwardly, a base horizontal in cross-section and having beveled sides extending upwardly and outwardly and meeting the outwardly and downwardly extending beveled surfaces.

3. In a roadway for vehicles, rails with a substantial body for embedment in the roadway, having a tread horizontal in cross section, longitudinally arranged with flanges on each side thereof, approaches from each side of the rail over the flanges to the tread, a vertical groove at one end of the rail and a vertical tenon at the other end thereof, the groove in one rail adapted for interlocking engagement with the tenon in another rail.

4. In a roadway for vehicles, rails with a substantial body for embedment in the roadway having a tread along the upper surface, horizontal in cross-section, longitudinally arranged, a distinct flange on each side thereof reaching upwardly a substantial distance above the tread, beveled surfaces extending outwardly and downwardly from the tops of the flanges on each side of the tread and adapted for a support for the wheels of vehicles in mounting and leaving the rails, together with a vertical groove in one end of the rails and a vertical tenon in the other end thereof, the groove in the end of one rail adapted for interlocking engagement with the tenon in the end of the other.

5. In a roadway for vehicles, a pair of rails arranged in longitudinal alinement paralleling each other along a roadway the required distance apart to receive upon their tread the wheels of automobiles, trucks and other four or two wheeled vehicles, such rails being provided with a tread for the wheels, flanges on both sides of the tread and beveled surfaces reaching outwardly and downwardly from the flanges to the roadway providing a guide for the wheels in mounting and demounting the rails together with a base horizontal in cross-section and having beveled sides reaching outwardly and upwardly from such base.

6. In a roadway for vehicles, rails having a substantial body, a tread, flanges on each side of the tread and a reinforcement embedded in the body of the rails and reaching upwardly into the flanges.

7. In a roadway for vehicles, rails having a substantial body, a tread, flanges on each side of the tread, beveled surfaces reaching from the tread outwardly and to the roadway and reinforcing strips embedded in the body of the rails and reaching into the most exposed portions of the rails.

In testimony whereof I affix my signature in presence of two witnesses.

FREDERICK L. PITMAN.

Witnesses:
WILLIAM H. KAYE,
MARK F. MENDENHALL.